United States Patent Office 3,845,047
Patented Oct. 29, 1974

3,845,047
2,3-BIS-(ACYLMERCAPTOMETHYL)-
QUINOXALINES
Christian Egli, Magden, Switzerland, assignor to Ciba-
Geigy Corporation, Ardsley, N.Y.
No Drawing. Filed July 6, 1971, Ser. No. 159,863
Claims priority, application Switzerland, July 6, 1970,
10,159/70
Int. Cl. C07d 51/78
U.S. Cl. 260—250                5 Claims

ABSTRACT OF THE DISCLOSURE

Compounds of the formula (I)
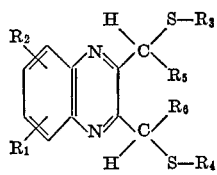

in which $R_1$ and $R_2$, independently of each other, represent hydrogen atoms, alkyl or alkoxy residues, halogen atoms, trifluoromethyl groups or nitro groups or $R_1+R_2$ represent an alkylenedioxy residue; $R_3$ and $R_4$ each represents a monovalent, or $R_3+R_4$ represent a divalent, possibly substituted hydrocarbon or acyl residue which separates the sulphur atoms by at most 4 carbon atoms, or $R_3+R_4$ may represent a direct bond; $R_5$ and $R_6$, independently of each other, represent a lower alkyl residue or preferably a hydrogen atom or $R_5+R_6$ represent a residue of the formula —$(CH_2)_n$— in which $n$ is a small whole number, preferably 1 or 2, and their pharmaceutically acceptable salts are useful as antiviral agents.

SUMMARY OF THE INVENTION

The present invention relates to new heterocyclic compounds. Especially it concerns compounds of the general formula (I)
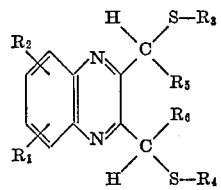

in which $R_1$ and $R_2$, independently of each other, represent hydrogen atoms, alkyl or alkoxy residue, halogen atoms, trifluoromethyl groups or nitro groups or $R_1+R_2$ represent an alkylenedioxy residue; $R_3$ and $R_4$ each represents a monovalent, or $R_3+R_4$ represent a divalent, possibly substituted hydrocarbon or acyl residue which separates the sulphur atoms by at most 4 carbon atoms, or $R_3+R_4$ may represent a direct bond; $R_5$ and $R_6$, independently of each other, represent a lower alkyl residue or preferably a hydrogen atom or $R_5+R_6$ represent a residue of the formula —$(CH_2)_n$— in which $n$ is a small whole number, preferably 1 or 2, and their pharmaceutically acceptable salts, and a method of manufacturing same as well as pharmaceutical preparations containing these compounds and a method of treating viral infections which consists in administering to a warm blooded being such as pharmaceutical preparations.

Alkyl groups $R_1$ and $R_2$ are especially lower alkyls. The term "lower" as used in connection with alkyl groups and groups and compounds derived therefrom such as alkylidene, alkylene, alkenyl, alkoxy or alkanoyl residues, alkanols, alkane carboxylic acids etc. designates here and hereinafter those residues which contain no more than 6 and preferably 1 to 4 carbon atoms. Lower alkyl groups are, for example, methyl, ethyl, propyl or isopropyl residues, or linear or branched butyl, pentyl oh hexyl residues which may be linked in any desired position.

Alkoxy groups $R_1$ and $R_2$ are primarily lower alkoxy residues, such as methoxy, ethoxy, propoxy, isopropoxy or butoxy groups. Halogen atoms $R_1$ and $R_2$ are, for example, fluorine, bromine or preferably chlorine atoms. Alkylenedioxy residues are preferably lower alkylenedioxy residues, for example methylenedioxy, ethylenedioxy or 1,3-propylenedioxy residues.

Hydrocarbon residues $R_3$ and $R_4$ may be residues of aliphatic character or aromatic residues. The term residues of aliphatic character describes those residues whose free valence starts from a carbon atom that is not part of an aromatic system.

Hydrocarbon residues of aliphatic character are, for example, aliphatic, cycloaliphatic, cycloaliphatic-aliphatic and araliphatic hydrocarbon residues.

Monovalent aliphatic hydrocarbon residues are, for example, lower alkyls such as those mentioned above, or lower alkenyl residues, such as allyl or methallyl residues.

Monovalent cycloaliphatic hydrocarbon residues and cycloaliphatic portions of cycloaliphatic-aliphatic hydrocarbon residues are polycyclic (for example bicyclic or tricyclic) hydrocarbon residues such as 1-adamantyl residues, or monocyclic residues, for example possibly lower alkylated monocyclic residues containing 3 to 7, especially 5 to 7 cyclic members, such as cyclopropyl, cyclopentyl, cyclohexyl and cycloheptyl residues.

Aliphatic portions of monovalent cycloaliphatic-aliphatic and araliphatic hydrocarbon residues are especially lower alkyls such as those mentioned above. Examples of monovalent cycloaliphatic-aliphatic hydrocarbon residues are cyclopentyl-methyl, 2-cyclohexyl-ethyl cyclohexyl and cycloheptyl residues.

Monovalent araliphatic hydrocarbon residues are especially phenyl-lower alkyl residues such as phenylethyl and benzyl residues.

Monovalent aromatic hydrocarbon residues are especially phenyl and α- and β-naphthyl residues.

When $R_3+R_4$ represent a divalent hydrocarbon residue, this residue preferably has aliphatic character and is, for example, a cycloaliphatic or preferably an aliphatic or araliphatic hydrocarbon residue. In the first place, there may be mentioned alkylene and alkylidene residues, especially lower alkylene and alkylidene residues such as methylene, ethylene, ethylidene, 1,2-propylene, 1,3-propylene, 2,2-propylidene, 2,2-butylidene, 2,3-butylene and 1,4-butylene residues. Furthermore there may be mentioned arylated, especially phenylated (especially lower) alkylene and alkylidene residues which are derived, for example, from the said alkylene and alkylidene residues, for example benzylidene, 2-phenylethylidene, 1-phenylethylidene, phenylethylene and 1-phenyl-propylene-(1,3) residues. Divalent cycloaliphatic hydrocarbon residues are preferably derived from the said cycloalkyl residues, especially from residues comprising 5 to 7 cyclic members. In these residues the free valences start from vicinal carbon atoms or from one and the same carbon atom. Relevant examples are cycloheptylidene, cyclohexylidene, cyclopentylidene, 1,2-cyclohexylene and 1,2-cyclopentylene residues.

Possibly present substituents of the said hydrocarbon residues $R_3$ and $R_4$ are, for example, halogen atoms such as those mentioned above, hydroxyl groups, which if desired may be etherified or esterified, for example with lower alkyl groups such as those mentioned above, or with lower alkanoyl groups, for example acetyl groups, or benzoyl groups, furthermore with free or functionally modified carboxyl groups.

Functionally converted carboxyl groups are, for example, cyano groups or especially esterified or amidated carboxyl groups. Esterified carboxyl groups are primarily groups in which the alcohol component is derived from the aforementioned monovalent aliphatic, cycloaliphatic or araliphatic hydrocarbon residues. Suitable ester-forming alcohols are preferably lower alkanols, cycloalkanols or phenylalkanols, which may, if desired, contain further substituents, for example methanol, ethanol, propanols, butanols, hexanols, cyclopentanols, cyclohexanols or phenyl-lower alkanols such as benzyl alcohols or phenylethanols whose phenyl ring may be substituted by residues of the kind of the residues $R_1$ and $R_2$.

In the amidated carboxyl groups (carbamyl groups) the amide nitrogen atom may be unsubstituted, mono- or di-substituted, for example by aliphatic hydrocarbon residues such as alkyl, alkenyl or alkylene residues, which may be interrupted by hetero atoms such as oxygen, nitrogen or sulphur atoms. Especially suitable amide substituents are lower alkyl, alkenyl and alkylene residues, such as those mentioned above, or corresponding residues interrupted by the said hetero atoms, for example alkoxyalkyl, alkylmercaptoalkyl or mono- or di-alkylaminoalkyl residues or oxa-, aza- or thia-alkylene residues such as possibly C-lower alkylated 3-oxa-, 3-aza- or 3-thia-pentylene-(1,5), 3-methyl-, 3 - ethyl - 3 - aza-hexylene-(1,6), 3-aza-hexylene-(1,6) or 4-methyl-4-aza-heptylene-(2,6) or phenylalkyl residues, which may be unsubstituted or whose phenyl residue is preferably substituted as indicated above for the phenyl-lower alkanols.

The term C-lower alkylated means, here as well as later-on, that the corresponding residue is substituted at carbon atoms by lower alkyl residues such as the ones named and especially by $C_{1-3}$-alkylresidues.

The amino group of the amides is thus more especially a free or mono- or di-lower alkylated amino group, or a possibly C-lower alkylated, especially $C_{1-3}$ alkylated pyrrolidino, piperidino, morpholino, thiomorpholino, piperazino, N'-lower alkylpiperazino or N'-(hydroxy-lower alkyl)-piperazino group.

Substituents of aromatic rings in the residues $R_3$ and $R_4$ are in the first place lower alkyl or alkoxy groups, especially those mentioned above, or halogen atoms, especially fluorine, chlorine or bromine atoms, or trifluoromethyl groups.

Acyl radicals $R_3$ and $R_4$ are acyl residues derived from carboxylic acids. The carboxylic acids may be derived from residues of aliphatic character or from aromatic residues, and any rings present may be carbocyclic or heterocyclic. Examples are aliphatic, preferably satured carboxylic acids, especially lower alkanecarboxylic acids such as acetic, propionic or butyric acid. Further relevant examples are: Unsaturated lower fatty acids such as acrylic, methacrylic and crotonic acid, also cycloaliphatic carboxylic acids, which contain, for example the aforementioned monovalent cycloaliphatic residues, such as cyclopentane-, cyclohexane-, cycloheptane-carboxylic acid or cyclohexylacetic acid, also araliphatic carboxylic acids, especially phenyl lower alkanecarboxylic acids such as phenylacetic or α-phenylpropionic acid, also aromatic, for example carbocyclic, carboxylic acids such as benzoic acid or α- or β-naphthalenecarboxylic acid, or aromatic-heterocyclic carboxylic acids, in the first place monocyclic carboxylic acids of this kind which contain, for example, a nitrogen or an oxygen or a sulphur atom, such as pyridine-2-carboxylic, pyridine-4-carboxylic acid, thiophene-3-carboxylic, thiophene-2-carboxylic, furane-3-carboxylic or furane-2-carboxylic acid, but especially pyridine-3-carboxylic acid.

The acyl radicals $R_3$ and $R_4$ may also be derived from carbonic acid or its derivatives and may be, for example, esterified or amidated carboxyl groups, especially the esterified and amidated carboxyl groups mentioned above as suitable substituents for the hydrocarbon residues $R_3$ and $R_4$.

When $R_3 + R_4$ form a bisacyl residue, there are specially suitable for this purpose bisacyls derived from dicarboxylic acids of aliphatic character. Acids of this kind are more especially aliphatic dicarboxylic acids such as alkanedicarboxylic acids, for example succinic, malonic or oxalic acid. Furthermore, there may be mentioned as examples cycloalkane-dicarboxylic acids, in the first place 1,2-dicarboxylic acids derived from the cycloalkyl residues mentioned above, such as cyclopentane-1,2-dicarboxylic acid and cyclohexane-1,2-dicarboxylic acid.

The acyl residues $R_3$ and $R_4$ may also carry substituents, especially the residues mentioned as suitable substituents for the hydrocarbon residues $R_3$ and $R_4$. Thus for example, the aromatic, carbocyclic or heterocyclic rings, for example phenyl, naphthyl, pyridyl, thienyl or furyl, may be mono-, di-, tri- or polysubstituted by lower alkyl residues, for example those mentioned above, especially methyl, ethyl, propyl or butyl, lower alkoxy residues, for example those mentioned above, chiefly methoxy or ethoxy, halogen atoms, in particular chlorine or bromine atoms, or trifluoromethyl groups.

The acyl residues of aliphatic character may be substituted for example by halogen atoms, such as fluorine, bromine or above all chlorine atoms, or hydroxy groups or by amino groups. Amino groups are unsubstituted, monosubstituted or especially disubstituted amino groups. Substituents of the amino groups are above all aliphatic hydrocarbon residues, for example the residues cited above as substituents of the carbamyl groups, which may also be substituted, for example by hydroxy groups, and/or interrupted by heteroatoms, such as oxygen, sulphur or nitrogen atoms. The amino groups accordingly are, for example, alkylamino groups, for example methylamino, ethylamino or propylamino, mono- or dialkylamino-alkylamino, dialkylamino groups, such as dimethylamino or diethylamino groups, or optionally C-lower alkylated, especially $C_{1-3}$-alkylated pyrrolidino, piperidino, morpholino, thiomorpholino, piperazino, N'-lower alkylpiperazino or N'-(hydroxy-lower alkyl)-piperazino groups.

The carbonyl groups of the acyl residues $R_3$ and $R_4$ may also be functionally modified and represent, for example, iminocarbonyl, hydrazinocarbonyl, hydroxyiminocarbonyl groups or acetalised carbonyl groups. Residues $R_3$ and $R_4$ with such modified carbonyl groups are, for example, also amidino and hydroxyamidino groups.

Lower alkyl residues $R_5$ and $R_6$ are for example methyl or ethyl groups.

The new compounds possess valuable pharmacological properties, and are chiefly active against viruses, as is indicated, for example, in tests on animals. They thus show, for example, a distinct anti-virus action in mice infected intraperitoneally with Herpes simplex virus (oral type or genitalis type) when given in doses of 125–500 mg./kg. p.o. The anti-virus action also occurs when treatment is applied 48 hours after the infection only. The new compounds also act against the Herpes simplex virus when locally applied, for example in the cornea test on rabbits on application of a 0.2–1.0% solution of the compounds. The compounds are therefore useful as medicaments for the treatment of virus diseases, especially those caused by the afore-mentioned viruses.

The new compounds are also valuable intermediates for the manufacture of other useful substances, especially of pharmacologically active compounds.

Valuable, because of their good antiviral activity, are especially compounds of the formula (II)

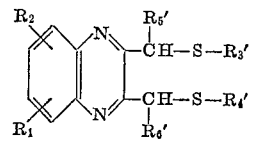

in which $R_1$ and $R_2$ have the meanings defined above, $R_3'$ and $R_4'$ independently of each other represent a monovalent araliphatic, cycloaliphatic, cycloaliphatic-aliphatic or especially aliphatic hydrocarbon residue or an acyl residue derived from an araliphatic, cycloaliphatic or in the first place aliphatic or aromatic carboxylic acid, or from carbonic acid or one of its derivatives, and which may be functionally modified, or $R_3'+R_4'$ stand for a direct bond or for an araliphatic, cycloaliphatic or especially aliphatic divalent hydrocarbon residue which separates the two sulphur atoms by one or two carbon atoms, and in which the said residues $R_3'$ and $R_4'$ may be substituted by halogen atoms, especially fluorine or chlorine atoms, hydroxyl groups, lower alkoxy groups, carboxyl groups, lower alkoxycarbonyl groups, amino groups, above all alkylamino, dialkylamino groups, such as dimethylamino or diethylamino, or optionally C-lower alkylated, especially $C_{1-3}$-alkylated pyrrolidino, piperidino, morpholino, thiomorpholino, piperazino, N'-lower alkyl-piperazino or N'-(hydroxy-lower alkyl)-piperazino groups, and $R_5'$ and $R_6'$ each represents lower alkyl or especially hydrogen.

Special mention deserve the compounds of the formula (III)

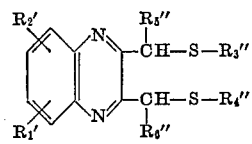

in which $R_1'$ and $R_2'$, independently of each other, represent methyl, methoxy or trifluoromethyl groups, fluorine, chlorine or hydrogen atoms or $R_1'+R_2'$ stand for a methylenedioxy or ethylenedioxy group, $R_3''$ and $R_4''$ independently of each other represent carbamyl or amidino residues, lower alkyl residues, for example one of the lower alkyl residues cited above, preferably methyl, ethyl, n-propyl, isopropyl, n-butyl or tert. butyl, phenyl-lower alkyl residues, for example phenethyl or benzyl residues, phenyl-lower alkanoyl residues, for example phenylacetyl residues, or especially lower alkanoyl residues, optionally substituted by hydroxy, fluorine or above all by chlorine, for example butyryl, propionyl or chiefly acetyl residues, and the phenyl residues may also be substituted by methyl, methoxy or trifluoromethyl groups, fluorine or chlorine atoms, and the oxo-oxygen atoms of the phenyl-lower alkanoyl and lower alkanoyl residues may be replaced by an imino, or $R_3''$ and $R_4''$ together represent a direct bond, a lower alkylidene residue, for example the 2,2-propylidene or 2,2-butylidene residue, or represent a lower alkylene residue that separates the sulphur atoms by 2 carbon atoms, such as the ethylene, 1,2-propylene or 2,3-butylene residue, and $R_5''$ and $R_6''$ each represents lower alkyl or in the first place hydrogen.

Especially valuable are compounds of the formula (IV)

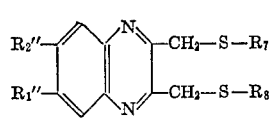

in which $R_1''$ and $R_2''$, independently of each other, represent chlorine or hydrogen atoms or methoxy groups or together stand for the ethylenedioxy residue, and $R_7$ and $R_8$ independently of each other represent unsubstituted amidino groups, lower alkyl residues, for example methyl, ethyl, isopropyl, n-propyl or n-butyl or especially lower alkanoyl residues possibly substituted by hydroxy, fluorine or above all chlorine, for example acetyl, propionyl or butyryl, or together represent a lower alkylidene residue, for example 2,2-propylidene or 2,2-butylidene, or a lower alkylene residue that separates the sulphur atoms by 2 carbon atoms, such as ethylene, 1,2-propylene or 2,3-butylene.

To be particularly highlighted are principally compounds of the formula IV, wherein $R_1''$ and $R_2''$ independently of each other represent chlorine atoms, methoxy groups or hydrogen atoms or together represent the ethylenedioxy residue and $R_7$ and $R_8$ independently of each other represent unsubstituted amidino groups, the acyl residues of monocyclic, homocyclic or preferably heterocyclic aromatic carboxylic acids, such as benzoyl, 4-pyridoyl and very particularly 3-pyridoyl residues, which may be di- or above all monosubstituted by lower alkyl residues, for example methyl, ethyl, n-propyl, isopropyl, n-butyl or tert.butyl, lower alkoxy residues, such as propoxy, ethoxy, but chiefly methoxy, halogen atoms, such as fluorine, bromine or especially chlorine, or trifluoromethyl groups, however, are preferably unsubstituted, and above all, the 2,3-bis-(nicotinoylmercaptomethyl)-quinoxaline of the formula

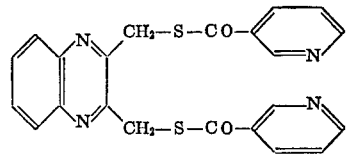

which, for example, shows a distinct anti-virus action in mice infected intraperitoneally with Herpes simplex virus on application of an oral dose of 125 mg./kg. and in the cornea test on rabbits on application of a 0.2% solution The new compounds may be prepared by known methods.

According to a preferred manufacturing process in a compound of the formula (V)

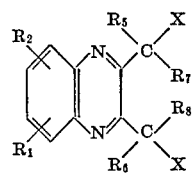

in which X represents a residue convertible into the residues —S—$R_3$ and —S—$R_4$ and $R_1$ to $R_6$ have the meanings defined above, the residues X are converted into the residues —S—$R_3$ and —S—$R_4$.

X is more especially a residue exchangeable for the residues —S—$R_3$ and —S—$R_4$, for example a reactively esterified hydroxyl group. Reactively esterified hydroxyl groups are, for example, organic sulphonyloxy groups such as alkanesulphonyloxy groups or arylsulphonyloxy groups such as toluene- or benzene-sulphonyloxy groups, but primarily halogen atoms, especially chlorine or bromine atoms. The exchange of X against —S—$R_3$ and —S—$R_4$ is preferably carried out by reaction with compounds of the formulae $R_3SH$ and $R_4SH$ or $$HS(R_3+R_4)SH$$

or with tautomers or salts, for example alkalimetal salts such as sodium or potassium salts thereof. The reaction is performed in the usual manner, for example in the presence of an acid acceptor, especially a basic inorganic or organic reagent, for example an alkali metal hydroxide or carbonate such as sodium or potassium hydroxide or carbonate, or of a tertiary amine, for example pyridine or trimethylamine, advantageously in a solvent, for example in water, methanol or ethanol, and if needed with heating.

X may also represent, for example, the mercapto group. In this case the conversion into the residues —$SR_3$ and —$SR_4$ is especially carried out by reaction with compounds of the formulae $R_3Y$ and $R_4Y$, in which Y represents a residue which can be exchanged by a mercapto group.

When $R_3$ and $R_4$ represent possibly substituted acyl residues, then an exchangeable residue Y is, for example, an esterified hydroxyl group, such as a reactively esterified hydroxyl group, for example one of those mentioned above, or a hydroxyl group esterified with a carboxylic acid, so that the compounds $R_3Y$ and $R_4Y$ represent carboxylic anhydrides. In this case it is advantageous to use pure anhydrides, thus compounds of the formulae $R_3$—O—$R_3$ and $R_4$—O—$R_4$, or

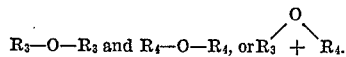

When $R_3$ and $R_4$ represent possibly substituted hydrocarbon residues, an exchangeable residue Y is especially a reactively esterified hydroxyl group, especially one of those mentioned above. The reaction of these compounds with the compounds of the formula V, in which X stands for a mercapto group, can be carried out in the usual manner, for example in the presence of a basic agent, especially those mentioned above, and in a solvent, for example in one of those mentioned, if needed with cooling.

When $R_3 + R_4$ stand for a possibly substituted hydrocarbon residue which separates the sulphur atoms by a carbon atom, the two residues Y together may also represent an oxo group which, if desired, may be reactively modified. The reaction may be carried out, for example, under the conditions conventionally employed in acetal formations, preferably in the presence of an acid, for example an inorganic acid, such as sulphuric or hydrochloric acid, or a Lewis acid, such as zinc chloride, advantageously in the presence of a solvent, for example of an excess of the reacting ketone or aldehyde, when needed with cooling.

When $R_3 + R_4$ represent a direct bond and X stands for the mercapto group, the conversion of compounds of the formula V into the final products of this invention may be achieved by oxidation. The oxidation is advantageously carried out under mild conditions and with the oxidants usually employed in the disulphide formation, such as atmospheric oxygen, iodine, oxidising salts such as copper-II-salts, hydrogen peroxide or a hypohalite, for example sodium hypochlorite.

In a resulting compound substituents may be introduced, modified or eliminated to suit the definition of the final products.

Thus, for example, free or functionally modified carboxyl groups, such as cyano groups, esterified or amidated carboxyl groups of the kind mentioned persent in a resulting compound can be converted one into the other by standard methods.

Free hydroxyl groups in a resulting compound may be etherified in the usual manner, for example by reaction with a reactive ester of an alkanol, preferably in the presence of a strong base, or if desired with diazomethane.

Modified acyl radicals $R_3$ and $R_4$ may be converted into free acyl groups, that is to say into residues having a carbonyl function, for example by hydrolysis, preferably in the presence of an acid or a base, such as those mentioned above.

The reactions mentioned above can be carried out in the usual manner in the presence or absence of diluents, condensing agents and/or catalysts, at room temperature or with cooling or heating, if desired or required under superatmospheric pressure and/or in an inert gas. Moreover, the conversion of final products into final products may be carried out in any desired order of succession.

Depending on the starting materials and reaction conditions used the final products are obtained in the free form or in the form of their salts which are likewise included in this invention. A resulting compound containing acid groups, such as carboxylic acids, can be converted in the usual manner, for example by reaction with an appropriate basic reagent, into salts with bases, especially therapeutically useful salts with bases, for example salts with organic amines, or into metal salts. Suitable metal salts are primarily alkali metal and alkaline earth metal salts, such as sodium, potassium, magnesium or calcium salts, or aluminium salts. From the salts the free compounds can be obtained in the usual manner, for example by reaction with an acid reagent. A resulting salt with an acid can be converted into the free compound in the known manner, for example with an alkali or an ion exchange resin. When the free compounds are reacted with organic or inorganic acids, especially such as are capable of forming therapeutically acceptable salts, acid addition salts are obtained. Such acids are, for example, hydrohalic, sulphuric and phosphoric acids, nitric or perchloric acid; aliphatic, alicyclic, aromatic and heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid, embonic, methanesulphonic, ethanesulphonic, hydroxyethanesulphonic and ethylenesulphonic acid; halobenzenesulphonic, toluenesulphonic, naphthalenesulphonic and sulphanilic acid; methionine, tryptophan, lysine or arginine.

These or other salts may also be used for purifying the new compounds, for example by converting the free compound into a salt thereof, isolating the salt and converting it again into the free compound. In view of the close relationship between the new compounds in the free form and in the form of their salts what has been said above and hereinafter and below concerning the free compounds relates suitably also to the corresponding salts wherever advantageous.

Depending on the starting materials and reaction conditions chosen and on the number of asymmetric carbon atoms present in them the new compounds may take the form of optical antipodes, racemates or isomer mixtures (racemate mixtures).

By utilising the physico-chemical differences of the ingredients a resulting isomer mixture (racemate mixture) can be resolved in the known manner into the two stereoisomeric (diastereomeric) pure racemates, for example by chromatography and/or fractional crystallisation.

Resulting racemates can be resolved into the diastereomers by known methods, for example by recrystallisation from an optically active solvent, or with the aid of microorganisms or by reaction with an optically active acid or base capable of forming salts with the racemic compound and separation of the salts thus obtained, for example by utilising their different solubilities, and from the diastereomers the antipodes can be liberated by treatment with a suitable reagent. Especially frequently used optically active acids are, for example, the D- and L-forms of tartaric, di-ortho-toluyltartaric, malic, mandelic, camphorsulphonic or quinic acid. Preferred optically active bases are, for example, brucine, strychnine, morphine, methylamine or α-phenylethylamine or their quaternary ammonium bases. It is advantageous to isolate the more active or less toxic of the two antipodes.

However, it is also possible to manufacture pure isomers, racemates or optical antipodes by using the appropriate starting materials in form of their pure isomers, racemates or optical antipodes.

The invention includes also any variant of the process in which an intermediate obtained at any stage thereof is used as starting material and any remaining process steps are carried out, or in which a starting material is formed under the reaction conditions or a reactant may be used in form of a salt thereof.

Thus, especially, the compounds of the formula V, in which X stands for the mercapto group, may be used in form of their salts, especially the alkali metal salts, for example the sodium salts.

It is also possible to form the diamino compounds of the formula VI under the reaction conditions by reducing an appropriate compound with other nitrogen functions, for example nitroamino compounds or benzfuroxans or benzfuranzans, in the usual manner, for example catalytically, as with hydrogen in the presence of a palladium catalyst.

The starting material used may also be a compound of the formula V in which one of the residues X is already replaced by the residue —S—$R_3$ or —S—$R_4$, and the other residue X is converted into the residue —S—$R_4$ or —S—$R_3$ respectively as indicated above.

The reactions according to this invention are advantageously carried out with starting materials that give rise to the groups of final products specifically mentioned above and primarily to the specially described or emphasised final products.

The starting materials are known or, insofar as they are new, they can be prepared by known methods.

The new compounds may be used, for example, in form of pharmaceutical preparations which contain them in the free form or in form of their salts, especially the alkali metal salts or of therapeutically acceptable acid addition salts in conjunction with a pharmaceutical organic or inorganic, solid or liquid excipient suitable, for example, for enteral parenteral or local administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, coated pills, capsules, suppositories, creams, ointments or in liquid form solutions (for example elixirs or syrups), suspensions or emulsions. They may be sterilised and/or contain adjuvants such as preserving, stabilising, wetting or emulsifying agents, solution promoters, salts for regulating the osmotic pressure or buffers. They may also contain further therapeutically valuable substances. The pharmaceutical preparations are formulated by usual methods.

The following Examples illustrate the invention.

EXAMPLE 1

A suspension of 6.3 g. of 2,3-bis-(bromomethyl)-quinoxaline and 3.04 g. of thiourea in 150 ml. of ethanol is refluxed for 3 hours, whereupon a homogeneous solution results. After cooling, crystals settle out which are suctioned off and recrystallised from water, to furnish 2,3-bis-(isothiuroniummethyl)-quinoxaline dibromide of the formula

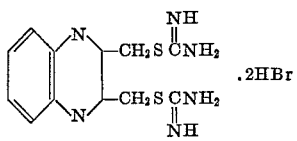

melting at 214–215° C. with decomposition.

EXAMPLE 2

4.4 g. of 2,3-bis-(mercaptomethyl)-quinoxaline are dissolved in the cold in 80 ml. of acetone, 0.1 g. of zinc chloride is added and hydrochloric gas is injected into the reaction mixture for one and a half hours, then the mixture is evaporated to dryness under a water-jet vacuum. The residue is mixed with saturated sodium carbonate solution and extracted with methylenechloride. The methylenechloride extract is dried and evaporated. The residue forms a crystalline substance which is dissolved in methylenechloride and chromatographed on a column of alumina. Chloroform elutes crystals which on recrystallisation from methylenechloride+methanol furnish 1,5-dihydro-3,3-dimethyl-3H-2,4-dithiepino[5,6 - p]quinoxaline of the formula

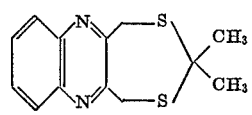

melting at 192–194° C.

The 2,3-bis-(mercaptomethyl)-quinoxaline used as starting material in this example may be prepared thus:

A solution of 5 g. of 2,3-bis-(isothiuroniummethyl)-quinoxaline dibromide in 30 ml. of 2N-sodium hydroxide solution is heated for 30 minutes at 80° C. The reaction mixture is then cooled, treated with active carbon and filtered. The filtrate is neutralised with 2N-hydrochloric acid, whereupon 2,3-bis-(mercaptomethyl)-quinoxaline of the formula

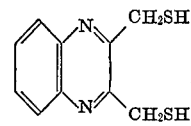

settles out; after recrystallisation from ethanol it melts at 92–93° C.

EXAMPLE 3

A solution of 3.0 g. of 2,3-bis-(mercaptomethyl)-quinoxaline in hot methanol is heated to 60° C. and air is blown through for 30 minutes. After cooling, crystalline 1,4-dihydro-2,3-dithiaphenazine of the formula

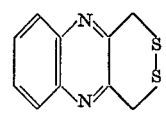

settles out which, after recrystallisation from methylenechloride+ether, melts at 164–165° C.

EXAMPLE 4

While cooling a solution of 3.6 g. of 2,3-bis-(mercaptomethyl)-quinoxaline in 70 ml. of 2N-sodium hydroxide solution with ice, 5 ml. of acetic anhydride are added, and the reaction mixture is vigorously agitated in the ice bath for 15 minutes, during which 2,3-bis-(acetylmercaptomethyl)-quinoxaline of the formula

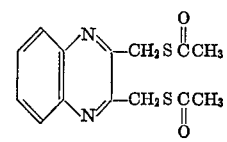

settles out in crystalline form. Two recrystallisations from methanol+water furnish a substance melting at 101–102° C.

EXAMPLE 5

6.3 g. of 2,3 - bis - (bromomethyl)-quinoxaline, 4.5 g. of n-butylmercaptan (5.35 ml.) and 2.0 g. of sodium hydroxide are dissolved in a mixture of 30 ml. of water and 30 ml. of methanol. The reaction mixture is stirred for 3 hours at room temperature and then refluxed for 15 minutes; after cooling, 2,3-bis-(n-butylmercaptomethyl)-quinoxaline of the formula

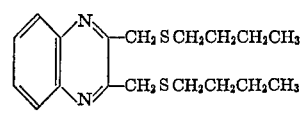

settles out. After recrystallisation from methanol it melts at 53–54° C.

EXAMPLE 6

6.3 g. of 2,3-bis-(bromomethyl)-quinoxaline, 2.4 g. of ethanedithiol (2.2 ml.) and 2.0 g. of sodium hydroxide are dissolved in a mixture of 30 ml. of water and 50 ml. of methanol. The reaction mixture is stirred for 30 minutes at room temperature and then refluxed for 1 hour. The hot solution is filtered and the filtrate cooled, whereupon 1,3,4,6 - tetrahydro - 2,5 - dithiocino[6,7-b]quinoxaline of the formula

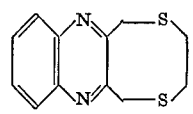

settles out; after recrystallisation from methanol it melts at 200–202° C.

EXAMPLE 7

A solution of 7.48 g. of 2,3-bis-(bromomethyl)-7,8-dihydro - para - dioxino[2,3-g]quinoxaline and 3.1 g. of thiourea in 200 ml. of ethanol is refluxed for 3 hours and then evaporated almost to dryness under a water-jet vacuum. The residue crystallises on cooling. The resulting 2,3 - bis - (isothiuronium - methyl) - 7,8 - dihydro-para-dioxino[2,3-g]quinoxaline dibromide of the formula

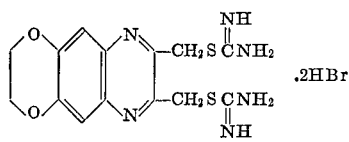

decomposes at 188–189° C. after recrystallisation from water.

The 2,3-bis-(bromomethyl) - 7,8 - dihydro - para - dioxino[2,3-g]quinoxaline used as starting material may be prepared as follows:

A solution of 28 g. of 6,7 - diamino - 1,4 - benzodioxane in 1 litre of methanol is mixed at room temperature with 52 g. of dibromodiacetyl. After a few minutes a crystalline precipitate settles out. The reaction mixture is kept for 1 hour with occasional agitation. The resulting 2,3-bis-(bromomethyl) - 7,8 - dihydro - para - dioxino-[2,3-g]quinoxaline of the formula

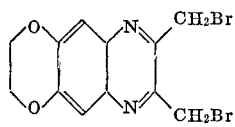

is suctioned off and recrystallised from methylenechloride+methanol, whereupon it melts at 209–210° C.

EXAMPLE 8

7.7 Grams of 2,3 - bis - (mercaptomethyl)-quinoxaline are dissolved in 80 ml. of 2N sodium hydroxide solution and 30 ml. of ethyl chloroformate are added dropwise to the solution while cooling with ice. The reaction mixture is left to stand overnight at room temperature. The precipitate that has separated out is filtered off and washed with ethanol. Recrystallisation of the residue from methylene chloride-hexane yields the 2,3-bis-(S-carboethoxymercaptomethyl)-quinoxaline of the formula

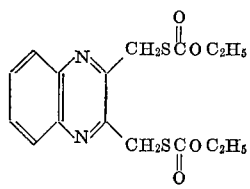

(m.p. 85–86° C.).

EXAMPLE 9

7.5 Grams of 2,3-bis-(mercaptomethyl)-quinoxaline are dissolved in 80 ml. of 2N sodium hydroxide solution, and 30 ml. of propionic acid anhydride are added while cooling with ice. The reaction mixture is then shaken in an ice bath for 20 minutes. The 2,3-bis-(S-propionylmercaptomethyl)quinoxaline of the formula

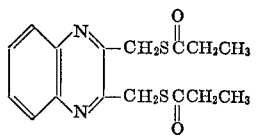

precipitates in the form of crystals. Recrystallization from methylene chloride-hexane yields a product melting at 88–89° C.

EXAMPLE 10

27 Grams of 2,3-bis-(mercaptomethyl)-quinoxaline are dissolved in 200 ml. of methylene chloride. 54 Grams of nicotinic acid anhydride are added to this solution at room temperature. The reaction mixture is then stirred at room temperature for 1 hour. The precipitated crystals are filtered off and digested with methanol. The residue yields the 2,3-bis-(N-nicotinoylmercaptomethyl)-quinoxaline of the formula

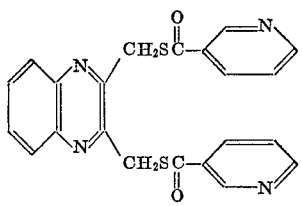

(m.p. 175–176°). Recrystallisation from methylene chloride-ethanol raises the melting point 179–180° C.

EXAMPLE 11

17.5 Grams of 2,3-bis-(bromomethyl)-6-chloro-quinoxaline are suspended together with 7.5 g. of thiourea in 140 ml. of ethanol. The reaction mixture is then heated for 3 hours under reflux. Upon cooling, the 2,3-bis-(isothiuronium-methyl)-6-chloro - quinoxaline - dibromide of the formula

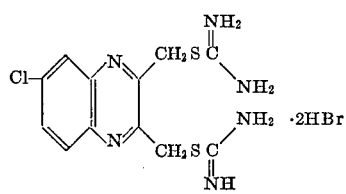

precipitates in the form of crystals, m.p. 197–202° C., with decomp.

The 2,3-bis-(bromomethyl)-6-chloro-quinoxaline used as a starting material can be prepared in an analogous manner as described in Example 7 (m.p. 146–148° C.).

EXAMPLE 12

10 Grams of 2,3-bis-(bromomethyl)-6-chloro-quinoxaline are suspended in 80 ml. of 2N sodium hydroxide solution and then heated for 30 minutes to 80° C. The mixture is filtered hot and the filtrate cooled and treated with 20 ml. of acetic acid anhydride while cooling with ice. The reaction mixture is shaken in an ice bath for 30 minutes, in the process of which the 2,3-bis-(acetylmercaptomethyl)-6-chloro-quinoxaline of the formula

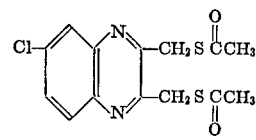

precipitates in the form of crystals. Recrystallisation twice from methylene chloride-hexane yields a product melting at 94–95° C.

EXAMPLE 13

10 Grams of 2,3-bis-(mercaptomethyl)-quinoxaline are dissolved in 100 ml. of chloroform. A solution of 15 g. chloroacetic acid anhydride in 40 ml. of chloroform is added dropwise at room temperature to this solution. Upon completion of addition the reaction solution is stirred for 2 hours at room temperature. The reaction mixture is subsequently extracted with cold 2N sodium carbonate solution. The organic phase is dried with sodium sulphate and evaporated. The residue crystallises and melts in the crude state at 105–107° C. Recrystallisation from methylene chloride-petroleum ether yields the 2,3- bis-(S-chloroacetyl-mercaptomethyl)-quinoxaline of the formula

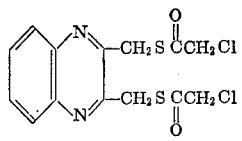

(m.p. 122–123° C.).

EXAMPLE 14

10 Grams of 2,3-bis-(mercaptomethyl)-quinoxaline are dissolved in 80 ml. of 2N sodium hydroxide solution. 15 Grams of chloroacetic acid anhydride are added to this solution while cooling with ice. The reaction mixture is then shaken for 1 hour at 0° C. The precipitated crystals melt in the crude state at 174–176° C. with decomposition. Recrystallisation from methanol-chloroform yields the 2,3-bis-(S-glycolmercaptomethyl)-quinoxaline of the formula

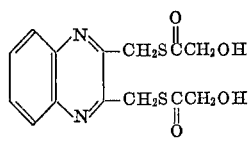

(m.p. 181–182° C., decomp.).

EXAMPLE 15

20.0 Grams of 2,3-bis-(mercaptomethyl)-quinoxaline are dissolved in 80 ml. of pyridine. A solution of 25.0 g. of isonicotinic acid chloride in 80 ml. of pyridine is added thereto while cooling with ice. The reaction mixture is stirred for 1 hour at room temperature and then poured onto ice. A crystalline precipitate forms which is collected by suction filtration, dissolved in ethanol and treated with charcoal. The 2,3-bis-(S-isonicotinoyl-mercaptomethyl)-quinoxaline of the formula

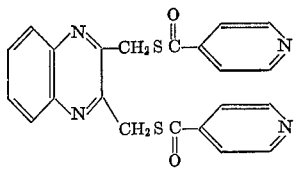

precipitates from the filtrate; m.p. 142–144° C. Recrystallisation from methylene chloride-ethanol raises the melting point to 150–151° C.

EXAMPLE 16

Tablets containing 500 mg. of 2,3-bis-(nicotinoyl-mercaptomethyl)-chinoxalin may be prepared with the following ingredients:

| | Per tablet (mg.) |
|---|---|
| 2,3-Bis-(nicotinoylmercaptomethyl)-chinoxalin | 500.0 |
| Wheat starch | 70.0 |
| Colloidal silicic acid with hydrolyzed starch | 30.0 |
| Magnesium stearate | 6.0 |
| Talc | 19.0 |
| | 625.0 |

Method: Half of the wheat starch is pasted with four times the quantity of water on a water-bath. The active substance is kneaded with the paste to form a plastic mass. The colloidal silicic acid with hydrolyzed starch is then worked in in portions. The plastic mass is passed through a sieve having a 4–5 mm. mesh and dried at 45° C. The dried granulate is passed through a sieve of 0.8–1.4 mm. mesh and the remaining disintegrating and lubrication agents are then added. After further homogenization tablets having a diameter of 11.5 mm. and weighing 625 mg. are compressed in the conventional manner.

EXAMPLE 17

Proceeding in a manner analogous to that described in the preceding examples the following compounds may also, for example, be obtained:

2,3-bis-[S-(2-pyridoyl)-mercaptomethyl]-quinoxaline,
2,3-bis-[S-(2-furoyl)-mercaptomethyl]-quinoxaline,
2,3-bis-[S-(2-thenoyl)-mercaptomethyl]-quinoxaline,
2,3-bis-[S-(2-pyrazinyl-carbonyl)-mercaptomethyl]-quinoxaline,
2,3-bis-(S-benzoyl-mercaptomethyl)-quinoxaline,
2,3-bis-[1-(S-allylmercapto)-ethyl]-6-methoxy-quinoxaline,
2,3-bis-(S-cinnamylmercaptomethyl)-quinoxaline,
2,3-bis-[S-(1-N,N-dimethylcarbamoyl-1-cycloheptyl)-mercaptomethyl]-quinoxaline,
2,3-bis-[S-(3,4-dimethoxyphenethyl)-mercaptomethyl]-quinoxaline,
2,3-bis-[1-(S-α-naphthylmercaptopropyl)]-quinoxaline,
2,3-bis-[S-(α-naphthylacetyl)-mercaptomethyl]-quinoxaline,
2,3-bis-[S-(1-carbonyl-4-methylpiperazino)-mercaptomethyl]-quinoxaline,
2,3-bis-[S-{2-(2-dimethylamino-1-carbonylamino-ethylene)-phenyl}-mercaptomethyl]-quinoxaline,
1,5-dihydro-3-(4-N,N-dimethylaminophenyl)-(3H)-2,4-dithiepino-[5,6-b]-quinoxaline,
3,4-dioxo-1,3,4,6-tetrahydro-2,5-dithiocino-[6,7-b]-quinoxaline,
2,3-bis-(S-(N-aminocarbamoyl)-mercaptomethyl)-quinoxaline,
2,3-bis-(S-hydroxyamidino-mercaptomethyl)-quinoxaline.

I claim:
1. A compound of the formula

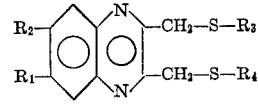

in which $R_1$ and $R_2$, independently of each other, stand for hydrogen, halogen or methoxy; $R_3$ and $R_4$ each independently stand for lower alkanoyl, lower alkanoyl substituted by halogen or hydroxy, or pyridine-2-, 3- or 4-carbonyl, and pharmaceutically acceptable salts thereof.

2. A compound as claimed in claim 1, said compound being a member selected from the group consisting of 2,3-bis-(acetylmercaptomethyl)-quinoxaline, 2,3-bis-propionyl-mercaptomethyl)-quinoxaline, 2,3-bis-(acetyl-mercaptomethyl)-6-chloro-quinoxaline, 2,3-bis-(chloroacetyl-mercaptomethyl)-quinoxaline, and 2,3-bis-(glycolyl-mercaptomethyl)-quinoxaline and their pharmaceutically acceptable salts.

3. A compound as claimed in claim 1, said compound being 2,3-bis-(S-nicotinoyl-mercaptomethyl)-quinoxaline or a pharmaceutically acceptable salt thereof.

4. 2,3-Bis-(isothiuroniummethyl)-quinoxaline dibromide.

5. 2,3-Bis-(mercaptomethyl)-quinoxaline.

References Cited
UNITED STATES PATENTS

| | | | |
|---|---|---|---|
| 3,141,886 | 7/1964 | Sasse et al. | 260—250 |
| 3,164,594 | 1/1965 | Dickore et al. | 260—250 R |
| 3,478,027 | 11/1969 | Paulus et al. | 260—250 R |

NICHOLAS S. RIZZO, Primary Examiner

U.S. Cl. X.R.

424—250; 260—247.1